Oct. 25, 1960 V. SANTARELLI 2,957,268
GARDEN DUSTER

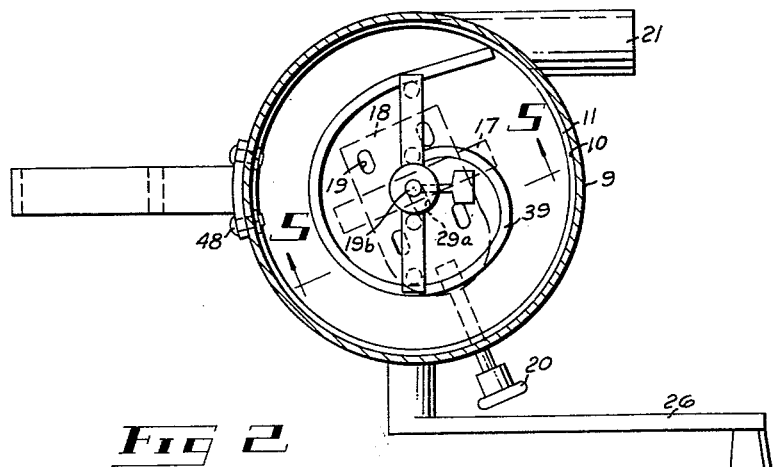
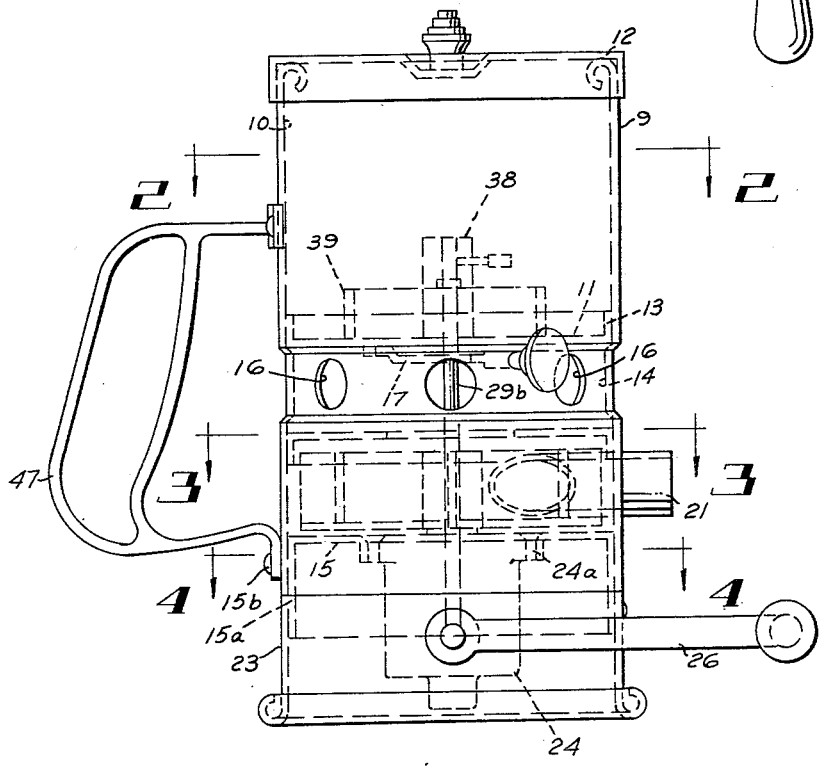

Filed Oct. 18, 1956 2 Sheets-Sheet 2

INVENTOR.
VINCENT SANTARELLI
BY
Donnelly, Mentag & Harrington
ATTORNEYS

United States Patent Office 2,957,268
Patented Oct. 25, 1960

2,957,268
GARDEN DUSTER

Vincent Santarelli, 6509 Heintz Ave., Detroit, Mich.

Filed Oct. 18, 1956, Ser. No. 616,832

1 Claim. (Cl. 43—148)

My invention relates to a new and useful improvement in a garden duster, so arranged and constructed that dust, of an insecticide nature, which may be deposited in the container may be expelled in a highly radiated or atomized condition from the outlet spout of the container, at a fairly high velocity.

It is an object of the invention to provide a duster of this class which will be simple in structure, economical of manufacture, durable, compact, highly efficient in use, and quite light.

Another object of the invention is the provision of a duster so constructed and arranged that an insecticide powder may be placed in one compartment of the container and permitted to flow in regulated amounts into the expelling compartment and provided with means for gathering the powder and maintaining it deposited over the outlet openings leading from one compartment to the other.

Another object of the invention is the provision in a duster of this class of a gear mechanism which may be operated by a crank and which is so constructed and arranged that the agitator member will be rotated at a different speed from the speed of the expelling member.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings, in which:

Fig. 1 is a side elevational view of the invention;

Fig. 2 is a sectional view taken on the line 2—2 of Fig. 1;

Figure 3:
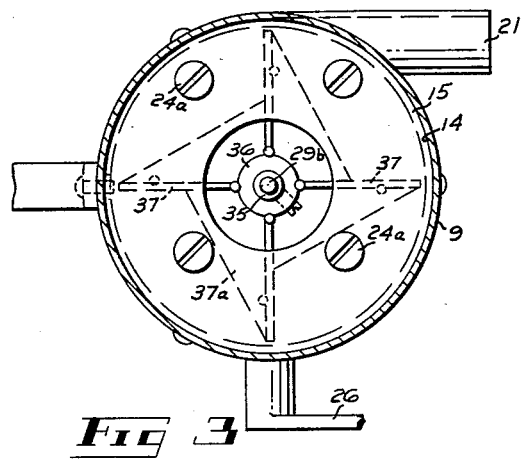
Fig. 3 is a sectional view taken on the line 3—3 of Fig. 1.
Figure 4:
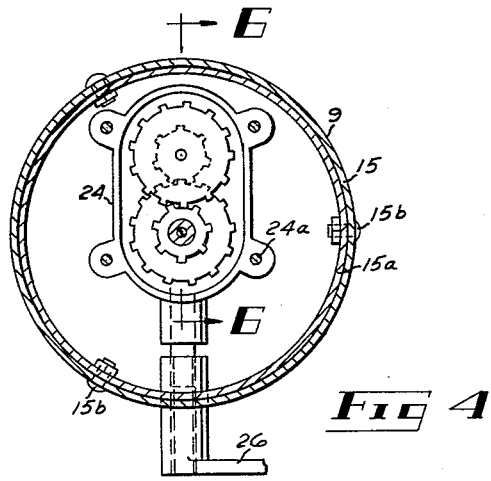
Fig. 4 is a sectional view taken on the line 4—4 of Fig. 1.
Figure 5:
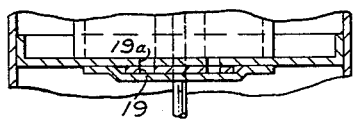
Fig. 5 is a fragmentary, sectional view taken on the line 5—5 of Fig. 2.
Figure 6:
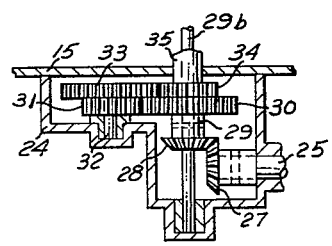
Fig. 6 is a fragmentary, sectional view taken on the line 6—6 of Fig. 4.

In the drawings, I have shown a tubular walled container 9 having the upper storage compartment 10 in which may be deposited insecticide powder. This upper compartment 10 is provided with a cover 12 and has a bottom 11 which is formed cup-shaped, and a side wall 13 soldered or otherwise secured to the inner face of the compartment 10. Below the bottom 11 and vertically aligned therewith is formed an ejection compartment 14 from which the insecticide powder passing into this compartment 14 from the compartment 10 may be ejected to the exterior. This compartment 14 is provided with a cup-shaped bottom 15 positioned in inverted relation and having a side wall 15ª secured to the container 9 by suitable bolts 15ᵇ. This bottom 15 is also secured, by soldering or in any other suitable manner, to the tubular extension 23 which forms an enclosure for the gear housing 24.

Formed in the container 9 are openings 16 which communicate the compartment 14 with the atmosphere so that air may be drawn into this compartment to be expelled with the dust.

Mounted on the under side of the bottom 11 is a bar 17 which serves to retain a closure plate 18 in slidable position. This closure plate is provided with openings 19 which may be slid into registration with similar openings 19ª formed in the bottom 11, so that the dust positioned in the compartment 10 may pass through these openings into the compartment 14. This closure plate 18 is slid by means of a rod 20 which extends to the exterior of the container 9. An outlet spout 21 communicates with the interior of the compartment 14 and through this outlet spout the dust within the compartment 14 may be expelled.

The gear housing 24 is suspended from the bottom 15 and secured thereto by means of screws 24ª. Extending into the gear housing 24 is a shaft 25 which extends exterior of the container 9 and on which is mounted a suitable crank 26. Fixedly mounted on this shaft 25 of the housing 24 is a bevelled gear 27 meshing with a bevelled gear 28 which is fixedly mounted on the collar or bushing 29 and to which is fixedly mounted a gear 30. A rotation of the shaft 25 will effect a rotation of this gear 30 which meshes with a smaller gear 31 fixedly mounted on a stub shaft 32. Fixedly mounted on this stub shaft 32 is a larger gear 33 meshing with a smaller gear 34 which is fixedly mounted on the collar 35. The shaft 29ᵇ is also keyed to the bevelled gear 28 so that this shaft 29ᵇ will rotate at the same speed as the gear 28. The collar 35 will of course rotate at a much higher speed than the shaft or rod 29ᵇ.

The collar 35 rotates about this shaft or rod 29ᵇ and is secured to a hub 36 of an impeller having impelling blades 37 radiating outwardly therefrom and adapted upon rotation to pass the inner end of the spout 21. Secured to the hub 36 and also to the vanes or blades 37 is a plate 37a which will serve as a carrying plate for carrying dust in front of the blades 37 toward the inner end of the spout 21.

Fixedly mounted on the shaft 29ᵇ within the compartment 10, as shown in Fig. 2, is a hub 38 secured to and extending outwardly from which is a spiral blade 39. This spiral blade is adapted to rest upon the upper face of the bottom 11 and upon rotation this spiral blade has the tendency to scoop the dust or powder inwardly toward the outlet openings 19ª. The closure plate 18 is provided with an elongated slot 29ª through which the shaft or rod 29ᵇ projects.

When dust or powder has been deposited in the compartment 10 and the plate 18 moved to a position so that this powder or dust may flow through the openings 19 and 19ª into the compartment 14 the shaft 25 is rotated by means of the crank 26, thus effecting a very rapid rotation of the impeller blades 37 past the inlet end of the spout 21. The rapid rotation of these impeller blades will draw air into the compartment 14 through the openings 16 and the air and powder will be expelled outwardly through the spout 21. As the dust or powder issues through this spout it will of course be mixed with air, and in a highly aerated condition, while at the same time travelling at a high velocity outwardly from the spout. In this manner, the dust or powder will be atomized and deposited upon the plants being treated with sufficient force to cause the dust or powder to cling to the plants. At the same time the shaft 29ᵇ will be rotated at a lower speed than the impeller blades so that the agitator, consisting of the member 39, will rotate but not at the high speed of the impeller blades. In this way, there is always assured a supply of dust or powder over the openings 19ª.

A handle 47 is secured to the container by suitable bolts 48 and by one of the bolts 15ᵇ. The container 9 is of course of sufficiently small size so that an operator may conveniently handle the container in one hand by means of the hand grip or handle 47 and at the same time rotate the crank 26 with the other hand.

The structure described has proven most economical in operation and very highly efficient in use.

What I claim is:

A duster of the class described, comprising: a tubular side walled open ended container having an upper storage compartment and a vertically aligned lower ejection compartment formed therein; an upper horizontal wall in said container forming the bottom wall of the upper storage compartment; a cover detachably mounted on the upper end of the container to enclose the storage compartment; a lower horizontal wall, spaced apart from said upper wall, in said container and forming the bottom wall of the lower ejection compartment; said bottom wall of said storage compartment having a plurality of openings for passage downwardly of dust deposited in the storage compartment into the ejection compartment; an agitator having a spiral blade disposed in the storage compartment for agitating the dust therein and directing the same toward said openings, a rotatable shaft extended upwardly through the ejection compartment and into the storage compartment and attached therein to said blade of said agitator for rotating same; an impeller rotatably mounted in the lower end of said ejection compartment adjacent the bottom wall thereof; said container being provided with openings through the side walls thereof communicating the upper end of the ejection compartment with the atmosphere at a point adjacent the lower side of the bottom wall of the storage compartment and above the impeller; an outlet spout communicating the lower end of the ejection compartment with the atmosphere; said impeller, upon rotation, passing the inner end of the spout for sucking air downwardly through said openings in the side walls of the container and impelling the air and the dust deposited in said ejection compartment outwardly through said spout; a mechanism for rotating said shaft and said impeller; said mechanism including means attached to and operative for rotating said impeller at a higher speed than the agitator shaft; manually operated means for operating said mechanism; and a horizontally disposed slidable closure plate mounted on the bottom wall of said storage compartment for opening and closing said first named openings.

References Cited in the file of this patent

UNITED STATES PATENTS

| | | |
|---|---|---|
| 967,266 | Thomas | Aug. 16, 1910 |
| 1,686,317 | Feeny | Oct. 2, 1928 |
| 1,862,666 | Duncan | June 14, 1932 |
| 1,911,927 | Root | May 30, 1933 |
| 2,157,630 | Root | May 9, 1939 |
| 2,740,230 | Clapper | Apr. 13, 1956 |

FOREIGN PATENTS

| | | |
|---|---|---|
| 382,012 | Great Britain | Oct. 20, 1932 |